(12) United States Patent
da Jornada et al.

(10) Patent No.: US 11,516,157 B1
(45) Date of Patent: Nov. 29, 2022

(54) MACHINE LEARNING FACILITATED DRAFTING OF RESPONSE TO COMMUNICATION

(71) Applicant: Dell Products, L.P., Round Rock, TX (US)

(72) Inventors: João Francisco Homrich da Jornada, Porto Alegre (BR); Walter Cristian Bruck Mundstock, Porto Alegre (BR); Daniel Carvalho Liedke, Porto Alegre (BR); Nirmala D'Souza, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 17/490,473

(22) Filed: Sep. 30, 2021

(51) Int. Cl.
*H04L 51/02* (2022.01)
*G06F 40/186* (2020.01)
*G06N 5/02* (2006.01)
*G06N 5/04* (2006.01)
*G06F 3/0482* (2013.01)

(52) U.S. Cl.
CPC ............ *H04L 51/02* (2013.01); *G06F 40/186* (2020.01); *G06N 5/022* (2013.01); *G06N 5/04* (2013.01); *G06F 3/0482* (2013.01)

(58) Field of Classification Search
CPC ..... H04L 51/02; G06F 40/186; G06F 3/0482; G06N 5/022; G06N 5/04
See application file for complete search history.

(56) References Cited

U.S. PATENT DOCUMENTS

| | | | |
|---|---|---|---|
| 2016/0162569 A1* | 6/2016 | Erle | G06F 16/288 |
| | | | 707/739 |
| 2018/0278554 A1* | 9/2018 | Kassabgi | G06F 40/56 |
| 2019/0095927 A1* | 3/2019 | Shimpi | G06N 20/00 |
| 2021/0073293 A1* | 3/2021 | Fenton | H04L 51/08 |
| 2021/0288927 A1* | 9/2021 | Wang | H04L 51/02 |
| 2021/0303578 A1* | 9/2021 | Dua | G06F 16/2228 |

\* cited by examiner

*Primary Examiner* — El Hadji M Sall
(74) *Attorney, Agent, or Firm* — Amin, Turocy & Watson, LLP

(57) ABSTRACT

One or more systems, computer-implemented methods and/or non-transitory computer-readable mediums are provided to facilitate a process to employ machine learning and selectable response options to respond to a communication from an identity. A system can comprise a processor, and a memory that stores computer executable instructions that, when executed by the processor, facilitate performance of operations. The operations can comprise determining a communication associated with a user identity, and, employing a machine learning model generated based on machine learning applied to one or more historical communications determined to have communicated respective intents, predicting an intent of the communication, and generating a set of one or more ranked response options corresponding to the intent, wherein the one or more response options of the set are ranked based on respective confidence levels individually determined for the one or more response options relative to the predicted intent.

20 Claims, 9 Drawing Sheets

600

Insert Better Resolution Screenshots of User Interface Here:

MACHINE LEARNING FACILITATED DRAFTING OF RESPONSE TO COMMUNICATION

BACKGROUND

Communications can be received from customers or other identities, where one or more intents and/or desired outcomes of the communications are not explicit. A computer-based system can be employed to facilitate responses to the communications.

SUMMARY

The following presents a simplified summary of the disclosed subject matter to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can comprise a processor and a memory that stores computer executable instructions that, when executed by the processor, facilitate performance of operations. The operations can comprise determining a communication associated with a user identity. The operations can further comprise, employing a machine learning model generated based on machine learning applied to one or more historical communications determined to have communicated respective intents, predicting an intent of the communication. The operations also can comprise, employing the machine learning model, generating a set of one or more ranked response options corresponding to the intent, the one or more response options being selectable via a user interface associated with an identity of an entity responsible for facilitation of a response to the communication, wherein the one or more response options of the set are ranked based on respective confidence levels individually determined for the one or more response options relative to the predicted intent of the communication.

An example method can comprise, predicting, by a system comprising a processor, one or more intents of a communication from an identity. The method further can comprise generating, by the system, one or more sets of one or more response options for subsequent selection by an entity facilitating a response to the communication, wherein the one or more response options are ranked based on one or more confidence levels assigned to the one or more intents predicted, and wherein the one or more confidence levels are assigned based on historical intents of one or more historical communications.

An example non-transitory computer-readable medium can comprise instructions that, in response to execution, cause a system comprising a processor to perform operations. These operations can comprise predicting one more ranked intents of a communication, wherein the one or more intents are ranked based on confidence level of correspondence of the intents to the communication by employing a machine learning model. These operations also can comprise generating one or more sets of one or more ranked response options for facilitating a response to the communication, wherein the one or more ranked response options are differently provided for the one or more ranked intents predicted, and wherein the one or more intents are ranked based on confidence level of correspondence of the one or more response options as responding to the individual one or more intents by employing a machine learning model. These operations further can comprise facilitating provision of the one or more sets of one or more ranked response options in a selectable format to an entity facilitating a response to the communication.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
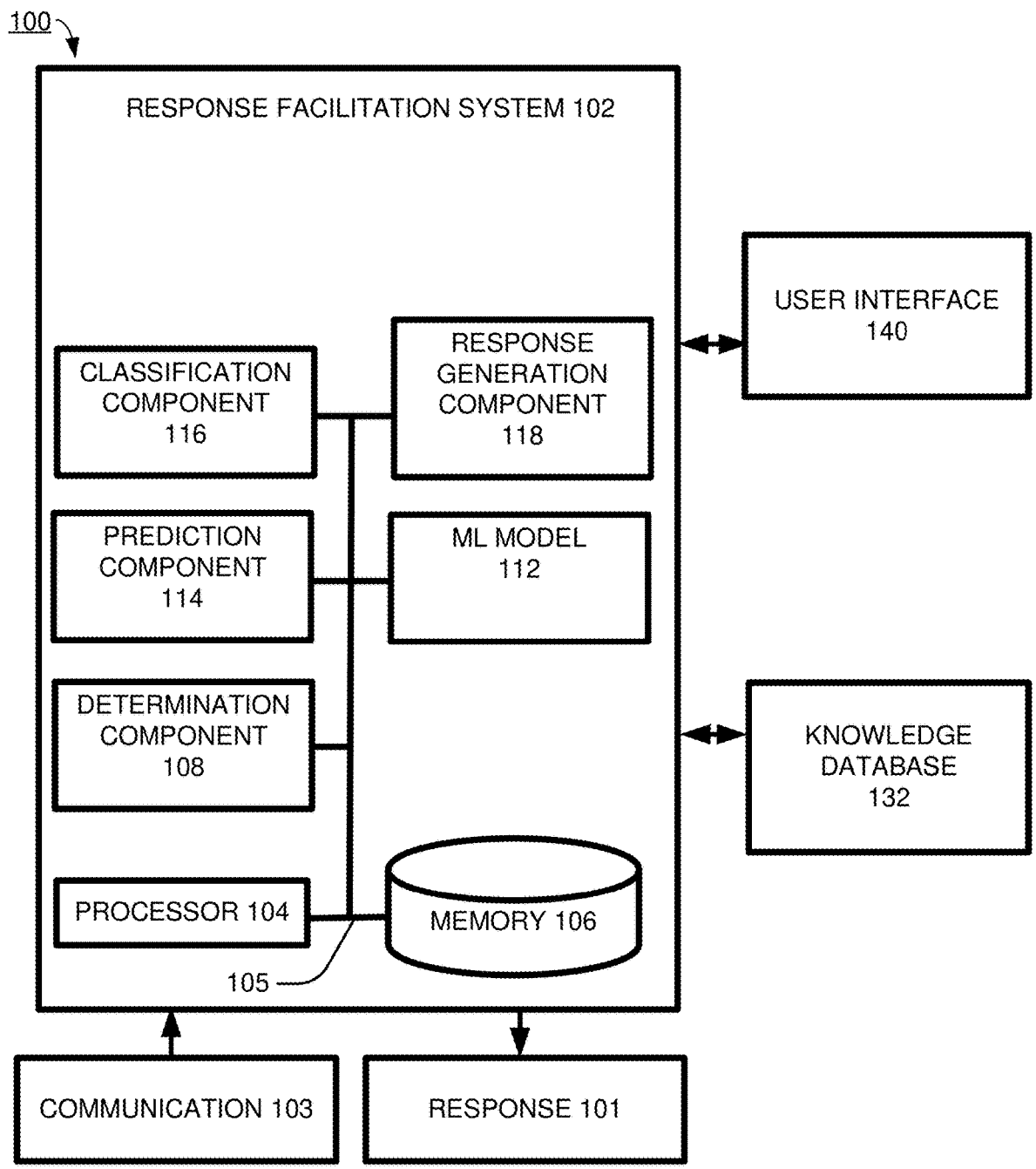
FIG. 1 illustrates an example system architecture that can facilitate a process to employ machine learning and selectable response options to respond to a communication from an identity, in accordance with one or more embodiments described herein.

Responding to communications from sending identities, such as customers, prospective customers or other identities, can be an important part of customer support. As used herein, the term "identity" can refer to a machine, device, smart device, component, hardware, software and/or human, and is used to refer to an aspect sending a communication. The communications can include one or more requests, inquiries, comments, feedbacks, suggestions and/or demands that can be related to any one or more of, but are not limited to, troubleshooting, risk analysis, purchasing, availability, returning, shipping, other product support and/or other types of commenting.

An identity can have one or more purposes or intents for sending a communication and/or one or more desired outcomes in response to sending the communication. That is, an identity can intend to ask a question, request a sample, inquire about troubleshooting, log a complaint, criticism, or appreciation, inquire about shipping progress or tracking, place an order, request a quote and/or any other intent. The identity can desire one or more outcomes such as receiving an answer, having a sample sent, receiving advice, having a discussion logged, finding out regarding shipping, receiving tracking information, having an order placed, receiving a quote and/or any other outcome. Indeed, a same intent, such as inquiring about shipping, can be accompanied by different outcomes for different identities, such as outcomes of simple tracking information or a desire to cancel due to backordering or other delay. In another example, one intent from a single entity, such as wanting a working product, can be responded two via multiple outcomes, such as a repair request and/or a product replacement.

However, in one or more examples, one or more of these intents and/or desired outcomes can be embedded in the communication such that the one or more intents and/or desired outcomes is/are not explicitly communicated. One or more desired outcomes can be unknown by the sending identity. Further, even if all intents and/or outcomes are communicated, a quantity of communications from such entities can be large.

That is, one problem in the customer service realm can be responding to such communications with efficient and/or timely responses. Responses can be lengthy, incoming communications can be often repetitive, a responding entity, such as a customer service entity, can lose attention and/or focus, mistakes and/or writing errors can be made, and/or responses can be sent including wrong information and/or not responding to the senders' intents and/or desired outcomes.

Prior techniques can lack an intelligent assessment framework, as is provided in one or more embodiments described herein. Indeed, prior techniques also can lack a proactive mechanism for addressing compatibility issues between communications and responses, and/or to measure, benchmark and/or verify types of responses utilized with one or more types of communications and/or requests. Further, current techniques can be lacking and/or omitted for addressing repeated issues and/or concerns with responses, such as for avoiding future same issues and/or concerns. Indeed, quality management can be a significant challenge in the customer service realm.

Another problem in the customer service field can be continually evolving types of inquiries and communication among entities addressing these evolving types of inquiries. Such communications can have new types of intents previously unseen and/or non-responded to by one or more responding entities. This can particularly be the case for new responding entities new to a job, position and/or task. Ability for entities to learn from one another and/or to build upon other entities' work can be lacking.

In general, techniques provided by one or more embodiments of systems, methods and/or transitory computer-readable mediums herein can address one or more of the aforementioned problems, issues, concerns and/or deficiencies. For example, one or more embodiments described herein can employ machine learning to analyze incoming communications, such as based on verified data/results and/or historical data/results. One or more aspects of incoming communications, such as intents, can be predicted and/or ranked. One or more confidence levels and/or thresholds of confidence levels can be employed to further qualify and/or provide a system of measurement for the one or more aspects of the communications.

In response to this analysis, machine learning further can be employed to provide one or more pre-scripted and/or non-pre-scripted response options to a communication. These one or more response options can be provided in a selectable format, such that one or more entities facilitating the response to a communication can select an appropriate answer. Selection can be subjective and/or based on one or more qualifying measurements, such as one or more confidence levels and/or thresholds. Furthermore, artificial intelligence and/or other programming can be employed to automatically provide additional response language, such as based on a predicted intent and/or based on a selection relative to the one or more response options. Additionally, one or more templates including headings, greetings, closings and/or other information, and/or including insertion locations for response options can be provided, such as in a selectable format.

Example Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100 and/or 200 as illustrated at FIGS. 1 and/or 2, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, a general example of an architecture is illustrated, with general description being provided below. While referring here to one or more processes, facilitations and/or uses of the non-limiting system architecture 100, it will be appreciated that description provided herein, both above and below, also can be relevant to one or more other non-limiting systems described herein, such as the non-limiting system architecture 200, to be described below in detail.

Illustrated at FIG. 1 is an example non-limiting system architecture 100 that can facilitate a process to employ machine learning and selectable response options to respond to a communication from an identity. The non-limiting system architecture 100 can be employed for analyzing a communication from an identity, such as a sending identity. In view of the analysis, the non-limiting system architecture 100 can facilitate fully and/or partially automatic generation of a response communication responding to the initial communication.

As illustrated at FIG. 1, the non-limiting system architecture 100 can comprise a response facilitation system 102. Response facilitation system 102 can comprise one or more components, such as a processor 104, memory 106, bus 105 determination component 108, prediction component 114, ML model 112, classification component 116 and/or response generation component 118. Generally, response facilitation system 102 can facilitate various processes for facilitating a response 101 (also herein referred to as a response communication) to the initial communication 103.

One or more aspects of a component can be employed separately and/or in combination, such as employing one or more of a memory or a processor of a system that includes the component to thereby facilitate the provision of the response 101. The determination component 108, prediction component 114, ML model 112, classification component 116 and/or response generation component 118 can employ the processor 104 and/or the memory 106. Additionally, and/or alternatively, the processor 104 can execute one or more program instructions to cause the processor to perform one or more operations by the determination component 108, prediction component 114, ML model 112, classification component 116 and/or response generation component 118.

Turning now to one or more operations of the response facilitation system 102, the determination component 108 can receive a communication 103 comprising one or more intents and/or one or more desired outcomes from a sending identity. The communication 103 can comprise computer data and/or metadata, identity information (e.g., customer information) and/or product information. The communication 103 can be provided in any suitable format, such as a text format, binary format and/or another suitable format.

The communication 103 can be received and/or retrieved by any suitable means. In one or more embodiments, the communication 103 can be received by the response facilitation system 102, such as by a component and/or aspect of the response facilitation system 102, such as the memory 106, a mail component and/or a download component.

Employing the various types of information comprised by the communication 103, the prediction component 114 can predict one or more intents of the sending of the communication 103 by the identity (e.g., sending identity). As will be appreciated and described in greater detail relative to one or more additional embodiments, the prediction component 114 can employ any of artificial intelligence, machine learning, model generation, heuristics, expressions and/or databases, such as the ML model 112 employing the knowledge database 132, to predict the one or more intents.

For example, in one or more embodiments, the ML model 112 can be employed by the prediction component 114 to compare, contrast and/or otherwise analyze the communication 103, such as relative to the one or more historical communications and historical intents stored at the knowledge database 132. That is, the knowledge database 132 can comprise one or more historical communications determined to have communication respective intents, and thus can comprise one or more of the respective historical intents. The historical communications and/or historical intents can be stored in any suitable format, such as a lookup table. It will be appreciated that the knowledge database 132 can be located at the response facilitation system 102 and/or external to the response facilitation system 102 but communicatively coupled to the response facilitation system 102.

Turning next to the response generation component 118, employing the various types of information comprised by the communication 103, the response generation component 118 can generate a set of one or more response options for responding to the communication 103. The one or more response options can comprise one or more portions of a full response 101 to the communication 103. That is, the one or more response options can be based on the communication 103, predicted intents and/or on the aforementioned one or more historical communications.

The one or more response options can be generated to facilitate one or more outcomes. Accordingly, an aspect of the response generation can be prediction and/or determination of one or more desired outcomes based on the communication 103.

As will be appreciated and described in greater detail relative to one or more additional embodiments, the response generation component 118 can employ any of artificial intelligence, machine learning, model generation, heuristics, expressions and/or databases, such as the ML model 112 employing the knowledge database 132, to generate the one or more response options. The ML model 112 can be employed by the response generation component 118 to analyze the communication 103 and/or the predicted intents such as relative to the one or more historical communications and historical intents stored at the knowledge database 132. Further, one or more response options can be pre-generated and/or pre-written, such as being stored at the knowledge database 132, and thus employed in such format by the ML model 112.

Turning now to the classification component 116, the one or more predicted intents and/or the one or more generated response options can be classified, such as ranked. Indeed, in one or more embodiments, both the one or more predicted intents and the one or more generated response options can be ranked. Generally, one or more selectively determined confidence levels can be assigned to the one or more predicted intents and to the one or more generated response options, with ranking increasing or decreasing according to the level of confidence as compared to other predicted intents and/or response options.

Assignment of individual confidence levels to the one or more predicted intents can be based on accuracy to the identity's actual intent of the communication 103. Assignment of individual confidence levels to the one or more response options can be based on predicted accuracy to fulfilling the one or more intents, such as by providing one or more outcomes. Finally, any of the aforementioned confidence level assignments/rankings can be individually determined employing any of artificial intelligence, machine learning, model generation, heuristics, expressions and/or databases, such as the ML model 112 employing the knowledge database 132 and/or historical communications.

The non-limiting system architecture 100 can further comprise a user interface 140. The user interface 140 can be internal and/or external to the response facilitation system 102. The user interface 140 can provide any one or more methods for allowing selection of one or more of the one or more response options. These can include visual, audible, tactile and or other electronic communication to a responding entity. As used herein, an "entity" can refer to a machine, device, smart device, component, hardware, software and/or human, and is used to refer to an aspect responding to a communication (i.e., in contrast to an "identity" that sends a communication). The selection can be based upon rank, such as where the aforementioned ranking is directly or indirectly indicated for individual response options.

It is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze a communication and automatically generate a response thereto employing a machine learning model in the time that one or more embodiments described herein can facilitate this process. And, neither can the human mind nor a human with pen and paper electronically analyze a communication and automatically generate a response thereto employing a machine learning model as conducted by one or more embodiments described herein.

In view of the operations performed by the prediction component 114, classification component 116 and/or response generation component 118, fast and efficient analysis of the communication 103, and machine learning-assisted response generation of the response 101 can be performed. One or more problems, issues, concerns and/or other deficiencies with existing techniques can be addressed, enabling a more accurate, efficient, quicker and/or proactive approach to response generation.

Figure 2:
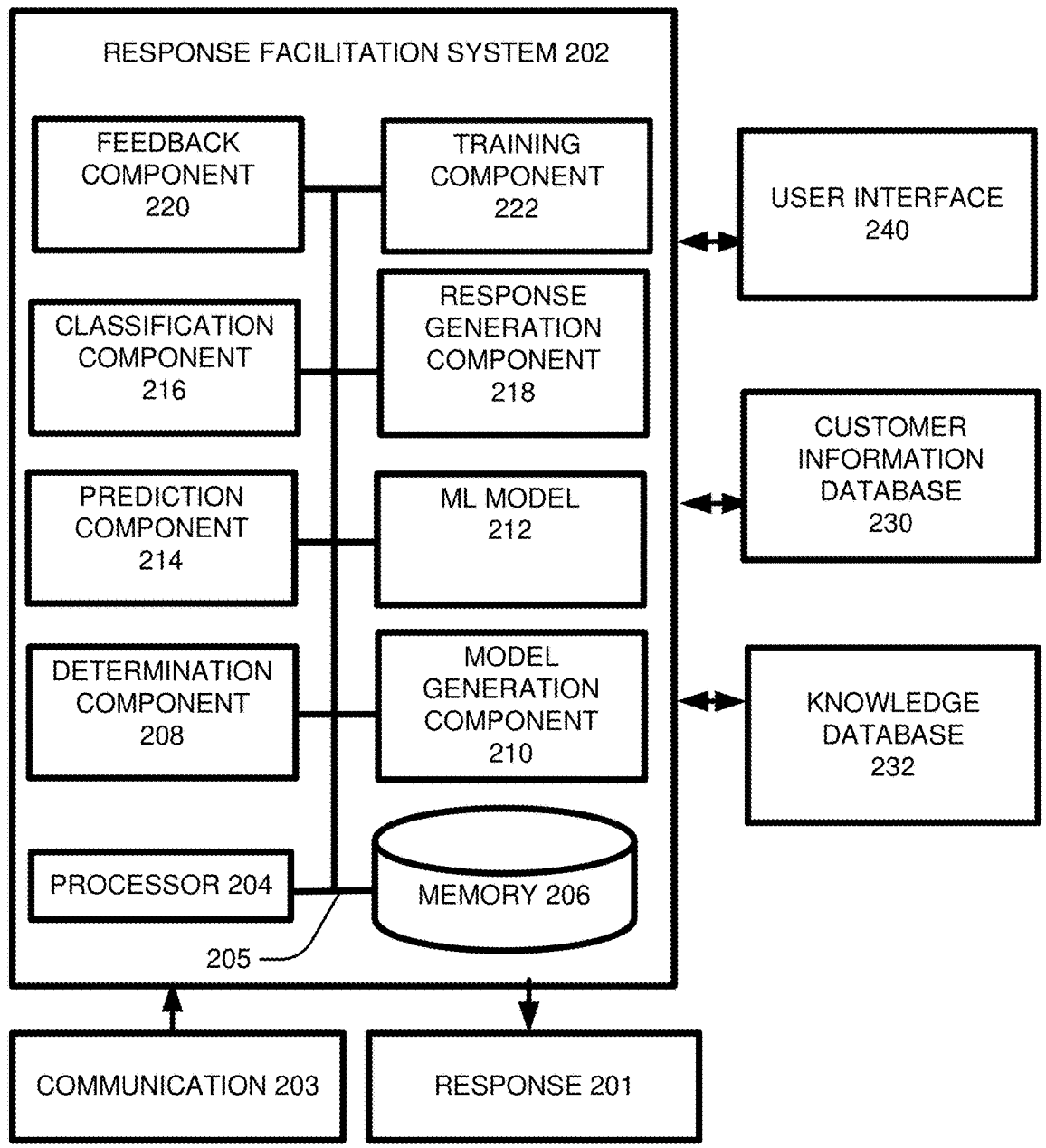
FIG. 2 illustrates another example system architecture that can facilitate a process to employ machine learning and selectable response options to respond to a communication from an identity, in accordance with one or more embodiments described herein.

Turning next to FIG. 2, the figure illustrates a diagram of an example, non-limiting system architecture 200 that can facilitate a process to employ machine learning and selectable response options to respond to a communication from an identity. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated at FIG. 2, the non-limiting system architecture 200 can comprise a response facilitation system 202. The response facilitation system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, response facilitation system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the response facilitation system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/ or another type of device and/or computing device.

In one or more embodiments, the response facilitation system 202 can be associated with, such as accessible via, a cloud computing environment. In one or more embodiments, the response facilitation system 202 can function in cooperation with and/or as part of another operating environment, such as the operating environment 900 illustrated at FIG. 9.

It will be appreciated that operation of the non-limiting system architecture 200 and/or of the response facilitation system 202 is not limited to facilitating a response to a single communication 203 at a time. Rather, operation of the non-limiting system architecture 200 and/or of the response facilitation system 202 can be scalable. For example, the non-limiting system architecture 200 and/or the response facilitation system 202 can facilitate a process to employ machine learning and selectable response options to respond to plural communications in parallel, such as from one or more identities.

The response facilitation system 202 can comprise one or more components, such as a memory 206, processor 204, bus 205, ML model 212, determination component 208, model generation component 210, prediction component 214, classification component 216, feedback component 220 and/or training component 222. Generally, response facilitation system 202 can facilitate a process to employ machine learning and selectable response options to respond to a communication from an identity. It will be appreciated that although particular one or more functions are described below as being performed by certain of the one or more components of the response facilitation system 202, it will be appreciated that in one or more other embodiments, one or more processes performed by one or more of the components can be performed by one or more others of the components.

One or more communications between one or more components of the non-limiting system architecture 200, and/or between an entity facilitating the communication 203 and the non-limiting system architecture 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 204, memory 206 and bus 205 of the response facilitation system 202.

For example, in one or more embodiments, response facilitation system 202 can comprise a processor 204 (e.g., computer processing unit, microprocessor, classical processor, quantum processor and/or like processor). In one or more embodiments, a component associated with response facilitation system 202, as described herein with or without reference to the one or more figures of the one or more embodiments, can comprise one or more computer and/or machine readable, writable and/or executable components and/or instructions that can be executed by processor 204 to facilitate performance of one or more processes defined by such component(s) and/or instruction(s). In one or more embodiments, the processor 204 can comprise the ML model 212, determination component 208, model generation component 210, prediction component 214, classification component 216, feedback component 220 and/or training component 222.

In one or more embodiments, the response facilitation system 202 can comprise a computer-readable memory 206 that can be operably connected to the processor 204. The memory 206 can store computer-executable instructions that, upon execution by the processor 204, can cause the processor 204 and/or one or more other components of the response facilitation system 202 (e.g., ML model 212, determination component 208, model generation component 210, prediction component 214, classification component 216, feedback component 220 and/or training component 222) to perform one or more actions. In one or more embodiments, the memory 206 can store computer-executable components (e.g., ML model 212, determination component 208, model generation component 210, prediction component 214, classification component 216, feedback component 220 and/or training component 222).

Response facilitation system 202 and/or a component thereof as described herein, can be communicatively, electrically, operatively, optically and/or otherwise coupled to one another via a bus 205 to perform functions of non-limiting system architecture 200, response facilitation system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, response facilitation system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 204 and/or memory 206 described above, response facilitation system 202 can comprise one or more computer and/or machine readable, writable and/or executable components and/or instructions that, when executed by processor 204, can facilitate performance of one or more operations defined by such component(s) and/or instruction(s).

Turning now to one or more operations of the response facilitation system 202, the model generation component 210 can be employed to generate the ML model 212. One or more historical communications, such as determined to have communicated respective intents can be provided to the model generation component 210. One or more historical responses to the historical communications also can be provided to the model generation component 210, thus exemplifying one or more outcomes in response to the one or more historical communications.

Each of these aspects of historical information can be stored at a suitable location, such as the knowledge database 232. The historical communications and/or historical intents can be stored in any suitable format, such as a lookup table. It will be appreciated that the knowledge database 232 can be located at the response facilitation system 202 and/or external to the response facilitation system 202 but communicatively coupled to the response facilitation system 202.

In addition to the aforementioned various types of historical data, the model generation component 210 can access and/or draw information regarding one or more identities, such as the contact information, communication history, product registrations, order and shipment data, feedback history, complaint history, company logistical structure, identity growth strategy and/or the like. It will be appreciated that one or more aspects of this identity information can be secure and/or unable to be compared/contrasted relative to information from another identity. In one or more embodiments, one or more responding entities and/or response facilitation systems 202 can have access and/or one or more different levels of access to different information and/or databases as compared to one or more other responding entities and/or response facilitation system 202. Therefore, the model generation component 210 can follow one or more security rules and/or thresholds where suitable.

Each of these aspects of identity information can be stored at a suitable location, such as the customer information database 230. The respective information can be stored in any suitable format, such as a lookup table. It will be appreciated that the customer information database 230 can be located at the response facilitation system 202 and/or external to the response facilitation system 202 but communicatively coupled to the response facilitation system 202.

Based upon this historical data and/or customer information data, the model generation component 210 can generate the ML model 212. The ML model can be capable of employing any one or more of heuristics, expression recall, language protocols and/or the like to analyze, classify, compare and/or contrast data from communications 203 to the historical data to determine one or more similarities, differences, meanings, intents, desired outcomes and/or the like. It will be appreciated that operation and/or performance of an ML model 212 is understood by one having ordinary skill in the art. It will be appreciated that one or more additional databases can be employed for the generation and/or training of the ML model 212.

Turning now to the one or more communications 203 from one or more identities, the determination component 208 can receive a communication 203 comprising one or more intents and/or one or more desired outcomes from a sending identity. The one or more intents and/or one or more desired outcomes can be explicit, inherent and/or otherwise provided relative to text, writing and/or other expression of the respective communication 203. The communication 203 also can comprise identity information, such as customer information, product information, contact information, account information and/or the like. The communication 203 can comprise computer data and/or metadata, pictures, files and/or other attachments. The communication 203 can be provided in any suitable format, such as a text format, binary format and/or another suitable format.

The communication 203 can be received and/or retrieved by any suitable means. In one or more embodiments, the communication 203 can be received by the response facilitation system 202, such as by a component and/or aspect of the response facilitation system 202, such as the memory 206, a mail component and/or a download component.

Employing the various types of information comprised by the communication 203, the prediction component 214 can predict one or more intents of the sending of the communication 203 by the identity (e.g., sending identity). The prediction component 214 can employ any of artificial intelligence, machine learning, model generation, heuristics, expressions and/or databases, such as the ML model 212 employing the knowledge database 232, to predict the one or more intents.

For example, in one or more embodiments, the ML model 212 can be employed by the prediction component 214 to compare, contrast and/or otherwise analyze the communication 203, such as relative to the one or more historical communications and historical intents stored at the knowledge database 232. Based on one or more aspects of pre-categorized historical data, such as intents relative to language, intents relative to phrases and/or the like, the ML model 212 can perform an analysis of the communication 203. The ML model 212 can further base such analysis on generation of new correspondences between language, phrases, expressions, identity information and/or the like that can be generated by the ML model 212 relative to the analysis.

One or more intents can be predicted by the ML model 212 for a communication 203. In one manner, the ML model 212 can determine that the communication 203 comprises more than one intent. In another manner, the ML model 212 can provide an intent with a highest likelihood of accuracy and also can provide one or more supplementary intents having equal and/or less likelihoods of accuracy, e.g., confidence levels, to be discussed in further detail below. Indeed, it will be appreciated that an intent can be provided and/or generated based on any suitable similarity criterion, such as of an intent relative to a historical intent, such as further based on any suitable similarity criterion relative to the communication 203 and one or more historical communications.

Figure 3:
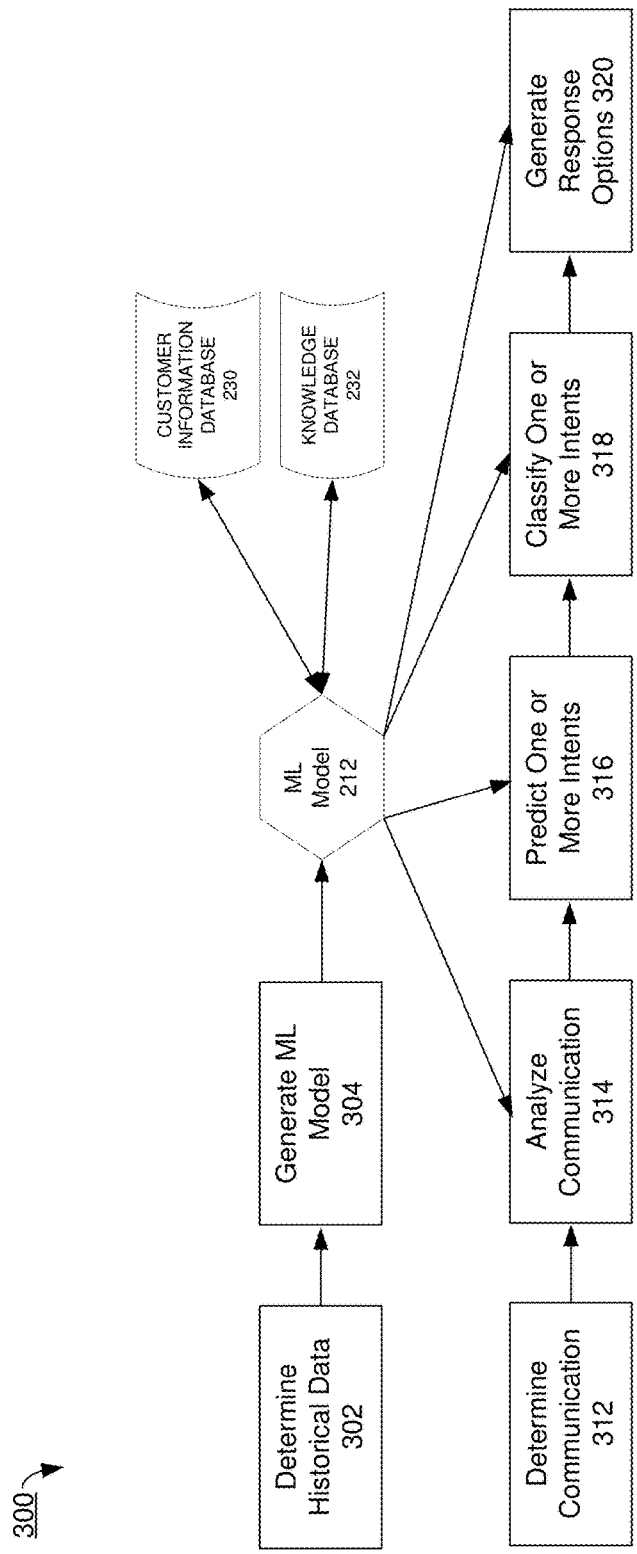
FIG. 3 illustrates a flow diagram of the process facilitated by the example system architecture of FIG. 2, in accordance with one or more embodiments described herein.

Looking briefly to FIG. 3, a process flow 300 is illustrated relative to the aforementioned ML model 212, model generation component 210, prediction component 214, classification component 216 and response generation component 218. That is, the process flow 300 can include one or more steps that can be employed by the ML model 212 and/or algorithm of the ML model 212 to respond to a communication 203. As illustrated, the ML model 212 can be generated in view of at least operation 302 for determining historical data and operation 304 for generating the ML model. The customer information database 230 and/or knowledge database 232 can be employed by the ML model 212 relative to operations 314, 316, 318 and/or 320. Indeed, subsequent to operation 312 for determining a communication, the ML model 212 can be employed for each of the operation 314 for analyzing the communication, operation 316 for predicting one or more intents, operation 318 for classifying the one or more intents, and/or operation 320 for generating one or more response options. It will be appreciated that the ML model 212 can, in one or more cases, add and/or modify data at the customer information database 230 and/or knowledge database 232.

Description now turns to the classification operation 318 and response generation operation 320.

Turning again to FIG. 2, and next to the response generation component 218, employing the various types of information comprised by the communication 203, the response generation component 218 can generate a set (also herein referred to as a group) of one or more response options for responding to the communication 203. Further, the response generation component 218 can generate plural sets of one or more response options. In one example, at least one set can be generated relative to each predicted intent. Additionally, and/or alternatively, different sets and/or subsets of response options can be generated relative to different outcomes being facilitated by the response options.

For example, in one or more embodiments, where one or more intents are predicted, one or more response options can be provided differently for respective ones of the one or more intents. Further, the one or more response options can be clustered into one or more sets based on the respective ones of the one or more ranked intents for which the one or more response options were generated.

Accordingly, the one or more response options can comprise one or more portions of a full response 201 to the communication 203. That is, generally, the one or more response options can be based on the communication 203, predicted intents, identity information and/or on the aforementioned one or more historical communications. The response generation component 218 can employ any of artificial intelligence, machine learning, model generation, heuristics, expressions and/or databases, such as the ML model 212 employing the knowledge database 232, to generate the one or more response options. The ML model 212 can be employed by the response generation component 218 to analyze the communication 203 and/or the predicted intents such as relative to the one or more historical communications and historical intents stored at the knowledge database 232.

In one or more embodiments, one or more response options and/or portions thereof can be generated by the ML model 212 in response to a particular communication 203 and/or particular intent. In one or more embodiments, generation of one or more response options can include employing pre-generated, pre-written and/or historical response options, portions of response options, language, phrases and/or expressions, such as being stored at the knowledge database 232, and thus employed in such format by the ML model 212.

Turning now to the classification component 216, the one or more predicted intents and/or the one or more generated response options can be classified, such as ranked. Indeed, in one or more embodiments, both the one or more predicted intents and the one or more generated response options can be ranked. Generally, one or more selectively determined confidence levels can be assigned to the one or more predicted intents and to the one or more generated response options, with ranking increasing or decreasing according to the level of confidence as compared to other predicted intents and/or response options.

Assignment of individual confidence levels to the one or more predicted intents can be based on accuracy to the identity's actual intent of the communication 203, such as based on any suitable similarity criterion relative to one or more historical intents and/or historical communications.

Assignment of individual confidence levels to the one or more response options can be based on predicted accuracy to fulfilling the one or more intents, such as by providing one or more outcomes. In one or more cases, where one or more intents are predicted, and one or more response options are provided differently for respective ones of the one or more ranked intents, the one or more response options can be ranked based on correspondence of individual ones of the one or more response options as responding to the respective ones of the one or more ranked intents by employing the ML model 212.

One or more confidence levels, associated rankings and/or other similarity criterion for the predicted intents and/or for the one or more response options can be stored, such as metadata, relative to one or more historical intents, historical response options and/or historical responses, such as stored at the knowledge database 232. Additionally, and/or alternatively, one or more of the aforementioned confidence level assignments/rankings can be individually determined employing any of artificial intelligence, machine learning, model generation, heuristics, expressions and/or databases, such as the ML model 112 employing the knowledge database 132 and/or historical communications.

As one example, a ranking range of 1-10 can be employed, where each rank can comprise a selected percentage of confidence. As another example, a color scheme can be employed.

The one or more confidence levels can be selectively determined prior to, during and/or after analysis of a communication 203. For example, it will be appreciated that a responding entity and/or an administrating entity employing the response facilitation system 202 can control such confidence levels, such as employing the user interface 240. Indeed, different confidence levels can be set relative to predicted intents, response options and/or the like. Furthermore, one or more thresholds can be set relative to the one or more confidence levels and/or sets of confidence levels. One or more rules can be selectively assigned for being followed by the classification component 216 relative to the thresholds. For example, in one case, indications can be added to response options and/or intents that satisfy, such as meet and/or exceed, a certain threshold. In one or more other cases, response options and/or intents that do not satisfy, such as do not meet and/or exceed, a certain threshold can be non-utilized relative to a communication 203. It will be appreciated that any other types of ranking and/or thresholds envisions can be suitable.

Figure 4:
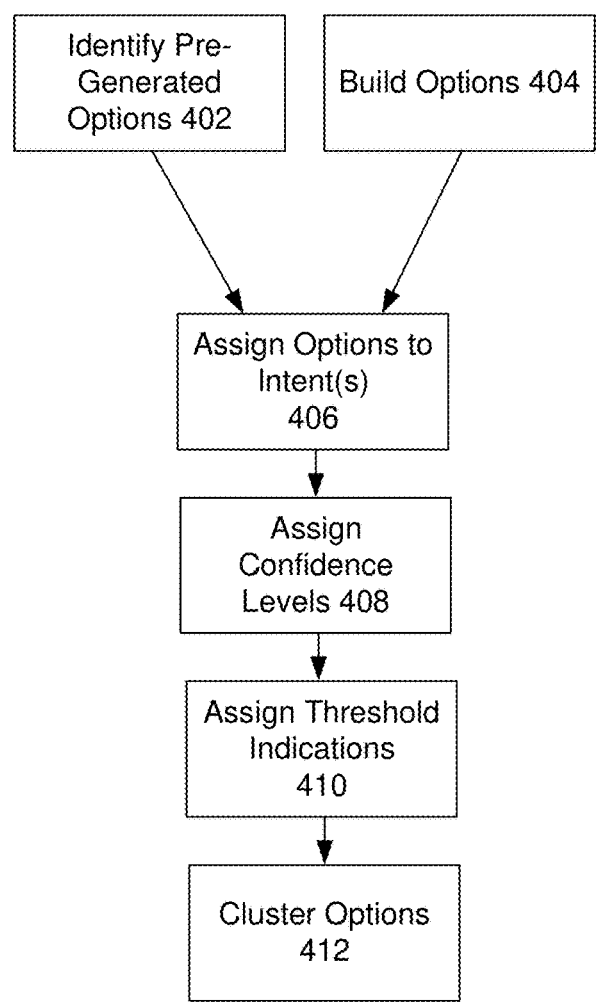
FIG. 4 illustrates a flow diagram of the process facilitated by the example system architecture of FIG. 2, in accordance with one or more embodiments described herein.

Referring now to FIG. 4, a process flow 400 is illustrated including one or more steps that can be employed by the ML model 212 and/or algorithm of the ML model 212 to provide the one or more response options. As indicated above, the ML model 212 can be employed for operation 402 of identifying pre-generated response options and/or for operation 404 for building/constructing one or more response options. At operation 406, one or more response options and/or sets thereof can be assigned to individual one or more predicted intents output from the prediction component 214. At operation 408, the ML model 212 and/or the classification component 216 can be employed to assign one or more confidence levels, rankings and/or thresholds to the one or more response options. At operation 410, one or more threshold indications can be assigned. Further, and not necessarily in the order illustrated, operation 412 can be executed by the response generation component 218 and/or ML model 212 to cluster one or more response options into the aforementioned sets and/or subsets.

Figure 5:
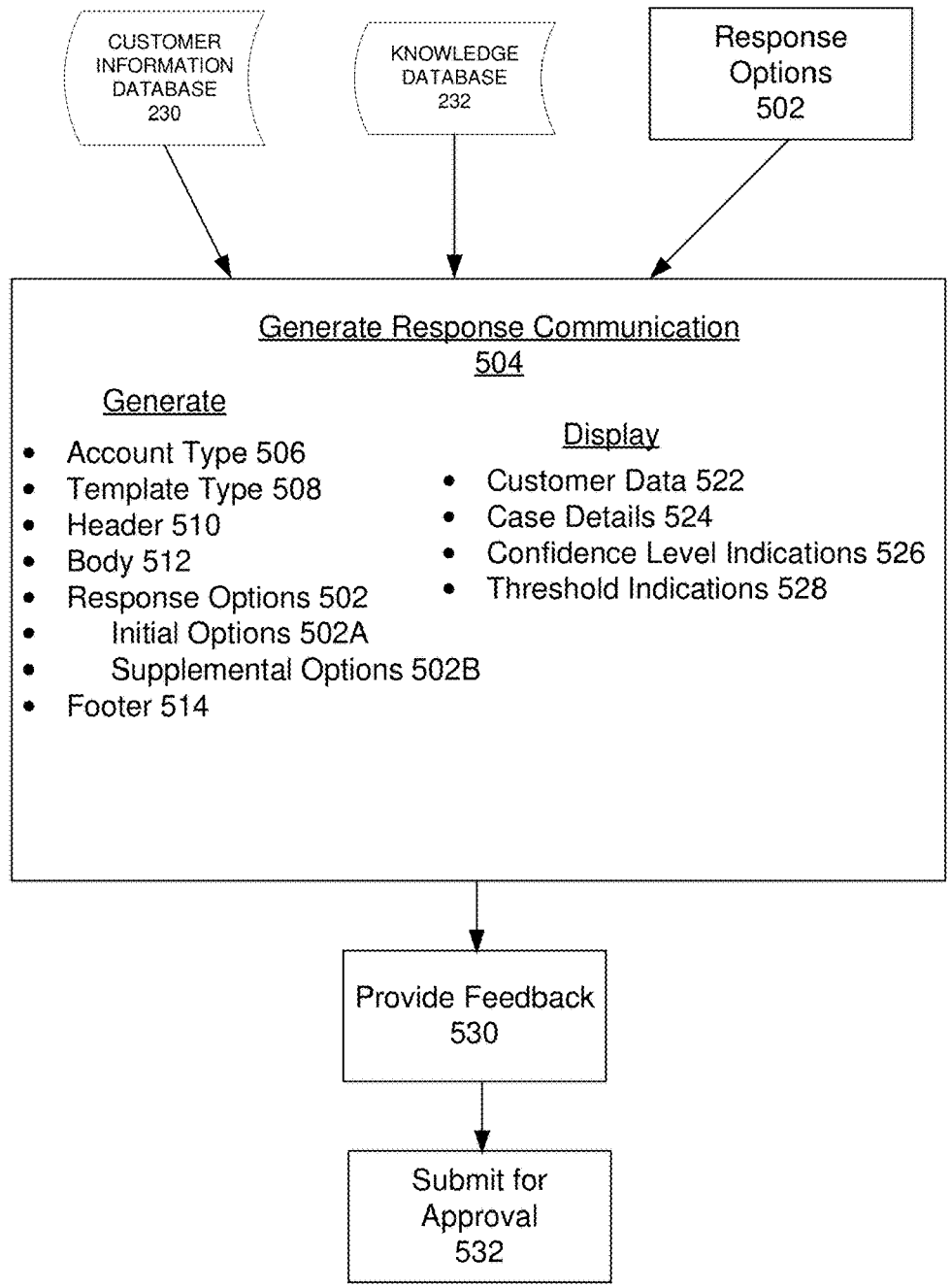
FIG. 5 illustrates a flow diagram of the process facilitated by the example system architecture of FIG. 2, in accordance with one or more embodiments described herein.

Turning now to FIG. 5, and also with reference to the response generation component 218 (FIG. 2), generation and/or construction of a response 201 will be described in detail.

An account type 506 can be determined, such as based on customer information at customer information database 230 and/or determined relative to analysis of the communication 203 by the ML model 212. For example, an account type can be commercial, residential, based on employee size, based on number of locations serviced, based on number of products maintained and/or the like.

The response generation component 218, employing the ML model 212, can identify and/or generate a template type 508. One or more template types can be stored, such as at the knowledge database 232. Template types can include informational, complaint response, shipping follow-up, invoice provision, quote provision and/or various other types.

Relative to a template type 508, a header 510 and/or footer 514 can be generated, such as including one or more greetings, closings, boiler plate statements, contact information and/or the like.

Different template types 508 can include different locations and/or numbers of locations for employing the one or more response options 502. For each location of response option insertion, one or more respective response options 502 can be selectable. Certain response options 502 and/or sets of response options can be employed for different aspects of a particular template type 508. Furthermore, relative to any insertion location of one or more response options 502, both one or more initial options 502A and one or more supplemental options 502B can be provided. That is, an initial option 502A can be one with a highest confidence level and/or ranking assigned thereto, with supplement options 502B being successive options based upon confidence level, rank and/or threshold.

It will be appreciated that response options can be directly entered into the body 512 and/or response options 502 selected can be subsequently facilitated by other text entered into the body 512.

It will be appreciated that generation and/or construction of the response 201 can be facilitated employing any suitable device, such as the user interface 240, although employment of the user interface 240 can be omitted in other cases. That is in one or more embodiments, a non-human response entity, such as an AI can be a responding entity, and as such, the suitable device can be a component of one or more computers, systems and/or the like. In one or more other embodiments, a responding entity can indeed employ the user interface 240.

The user interface 240 can be internal and/or external to the response facilitation system 202. The user interface 240 can provide any one or more methods for allowing selection of one or more of the one or more response options. These can include visual, audible, tactile and or other electronic communication to a responding entity. Any one or more selections can be based upon rank, such as where the aforementioned ranking is directly or indirectly indicated for individual response options. The user interface 240, such as a graphical user interface, can employ any one or more of drop downs, details that flash onscreen only when hovering over one or more aspects, selectable windows, sliding displays, sub-windows, fill-in boxes and/or the like. Accordingly, it also will be appreciated that the user interface 240 can be at least partially generated by the response generation component 218.

Relative to selection of the one or more response options 502, one or more other locations of selectable response options can become visible (and/or become available). Relative to selection of one or more response options, one or more aspects of additional information can be automatically generated and inserted, filled in and/or the like relative to the response 201 being generated. This automatic generation can be facilitated by the response generation component 218 and/or ML model 212. In one or more cases, one or more aspects of additional information can be corresponded, such as by the ML model 212, such as based on the aforementioned historical data. For example, where a response option is selected to facilitate a repair, automatic information can be added to the response 201 relative to broken product shipment details and/or other customer information. In this way, the response facilitation system 202 can facilitate dynamic completion of a response 201 to a communication 203.

Indeed, in one or more embodiments, the account type 506 and/or template type 508 can be selectable. Further, where selection is made other than as initially provided for the response 201, one or more different response options, sets of response options and/or other text can be automatically inserted, added, modified, deleted and/or reduce relative to the response 201.

Moreover, in one or more embodiments, it can be defaultly defined relative to the response generation component 218 that no initial selection is automatically made for one or more of the account type 506, template type 508, header 510, body 512, response options 502 and/or footer 514.

It will further be appreciated that the response generation component 218 can allow for editing and/or selection relative to any aspect of a response 201, where suitable and/or warranted. This can include the header 510, body, 512, footer 514 and/or other aspect of the response 201.

Relative to a situation where no intent can be predicted by the prediction component 214 and/or where no intent predicted passes one or more selectively employed thresholds, a default and/or generic template type 508 can be employed. Any one or more generic header 510, body 512, response options 502 and/or footer 514 also can be employed relative to a generic template type 508. In such case, numerous aspects of a response 201 can be selectable. It will be appreciated that one or more selectable aspects, such as response options 502 still can be provided, such as in a ranked format, although an indication of failure to satisfy a threshold can be provided by the response generation component 218, such as via metadata or visual/audio cue. Again, as indicated above, any of the account type 506, template type 508, header 510, body 512, response options 502 and/or footer 514, whether generic or intent-specific, can be stored at a database accessible by the response generation component 218 and/or the ML model 212, such as at the knowledge database 232.

Still referring to FIG. 5, it will be appreciated that construction of the response 201 and/or selection of response options and/or other aspects of the response 201 can be non-blind operations relative to a responding entity. That is, customer data 522, case details 524, confidence level indications 526 and/or threshold indications 528 can be accessible by the responding entity relative to the response 201, such as to facilitate informed selection of a selectable aspect, such as the one or more selectable response options 205. For example, relative to the user interface 240, one or more of hover options, dropdowns, side windows and/or the like can be employed to provide one or more of these aspects of information.

It will be appreciated that one or more aspects of the customer data 522 and/or case details 524 can be secure, limited and/or unable to be employed for one or more responding entities. In one or more embodiments, one or more responding entities and/or response facilitation systems 202 can have access and/or one or more different levels of access to different information and/or databases as compared to one or more other responding entities and/or response facilitation system 202. Therefore, the response generation component 218 can follow one or more security rules and/or thresholds where suitable.

Referring still to FIGS. 2 and 5, subsequent to and/or at least partially in parallel with operation 504 for generating the response 201 (e.g., response communication), the feedback component 220 can enable input of automatic or selectively input feedback relative to one or more aspects of the operation 504. Automatic feedback can include selection of one response option over another, selection of a non-default selectable aspect, use of certain phrases and/or expressions relative to a predicted intent and/or by a particular responding entity and/or the like. Selectively entered feedback can be facilitated via any suitable means of communication, such as information sent to the generation component 210 and/or changes, additions and/or subtractions made to the knowledge database 232 and/or customer information database 230. In one or more embodiments, feedback can be facilitated via the user interface 240.

Feedback operation 530 can allow for quality control of the responses 201 and/or of the ML model 212, for instance. Feedback can allow for one or more indication flags and/or treatment data to be assigned to one or more predicted intents, response options and/or the like. Feedback can thus be provided by the responding entity facilitating the response 201 and/or by another feedback and/or quality-related entity. Accordingly, feedback can be submitted and/or flagged relative to one or more response options as one or more messages and/or comments to a responding entity.

Submission for approval operation 532 likewise can be facilitated by the response generation component 218, such as via the user interface 240. In one or more cases, feedback can thus be entered before and after operation 532, such as by different operating entities.

Employing the feedback, predicted intents, response options, selections and/or additional text of and/or relative to a response 201, the training component 222 can execute a training operation of the ML model 212. Training can be continuous and/or conducted subsequent to response generation and or submission for approval. Accordingly, the knowledge database 232 can continue to be refined, allowing for the response facilitation system 202 to increase its own efficiency, accuracy and speed over time. Response options and/or predicted intents can be newly added to the knowledge database and/or better response options and/or predicted intents generated by the ML model 212.

In one or more cases, response generation by the response generation component 218 can be automatic and/or more fully automatic overtime, such as due to the training of the ML model 212. One or more predicted intents can be selectively associated with one or more fully automatic response templates 508. Indeed, whether automatically or selectively, such as by an administrating entity, one or more selections of response options can be tiered down and/or automatically facilitated by the ML model 212, for example.

Example User Interface

Figure 6:
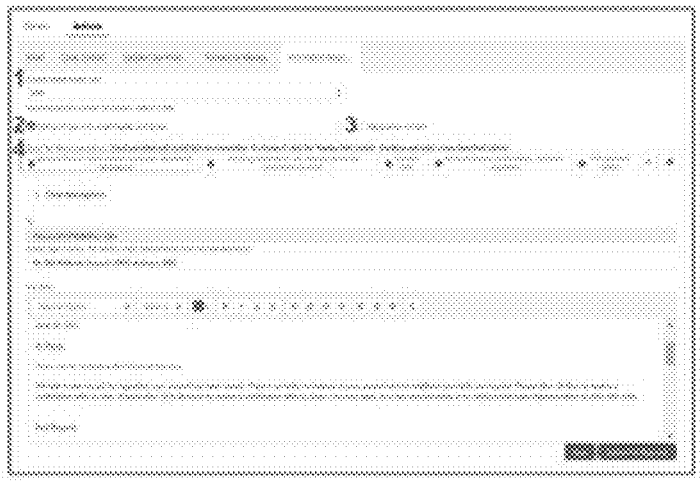
FIG. 6 illustrates example user interface displays facilitated by the example system architecture of FIG. 2, in accordance with one or more embodiments described herein.
Figure 6:
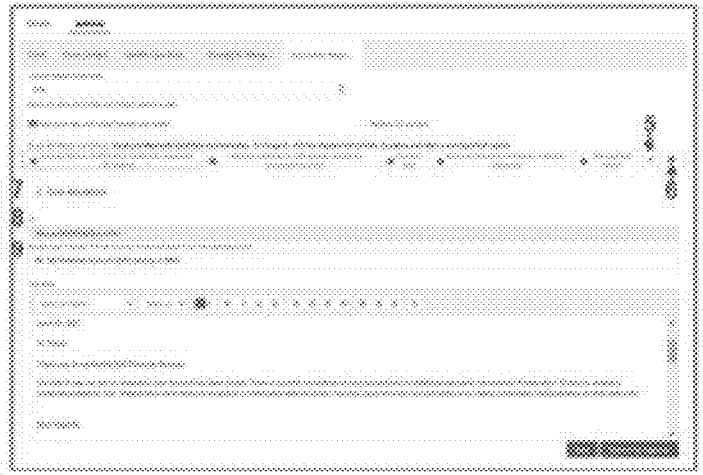
Figure 6:
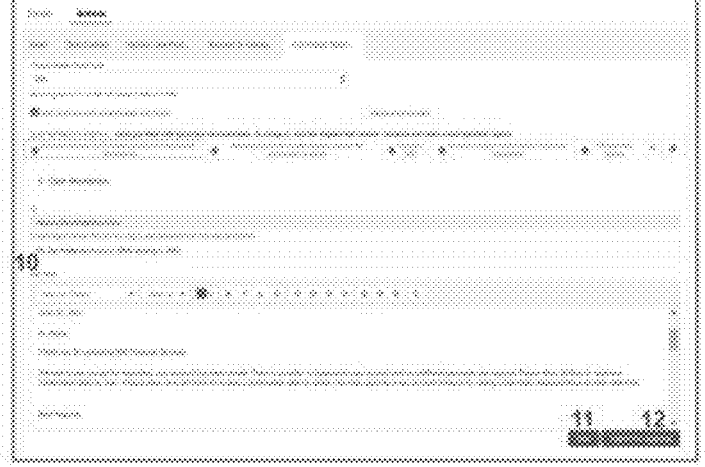

Turning now to FIG. 6, a set of diagrams 600 includes example graphical user interface displays relative to response generation as described above in accordance with FIGS. 2 to 5.

At display 602, a header/footer type can be selectable at location 1. In one or more embodiments, different headers and/or footers can correspond to different account types. One or more response options associated with the header/footer type can be selectable at location 2. At location 3, a responding entity can be enabled to fully replace a body of the response. At location 4, a responding entity can select one or more response options from one or more sets of response options. Selection can be facilitated by one or more drop downs.

At display 604, location 5 can include selection of supplemental response options, while location 6 can include a full selection of both initial and supplemental response options. Location 7 can include case description information that will not be included in the response but can assist the responding entity in making any of the aforementioned selections. Location 8 can include the contact information, such as email address, where the response will be sent when completed. Location 9 can include customer information, such as account number and/or type.

At display 606, location 10 can include a body of the response where text from and/or relative to the response options is entered. Location 11 can allow for saving of the completed response, while location 12 can allow for submission of the completed response for approval.

Example Process Flows

Figure 7:
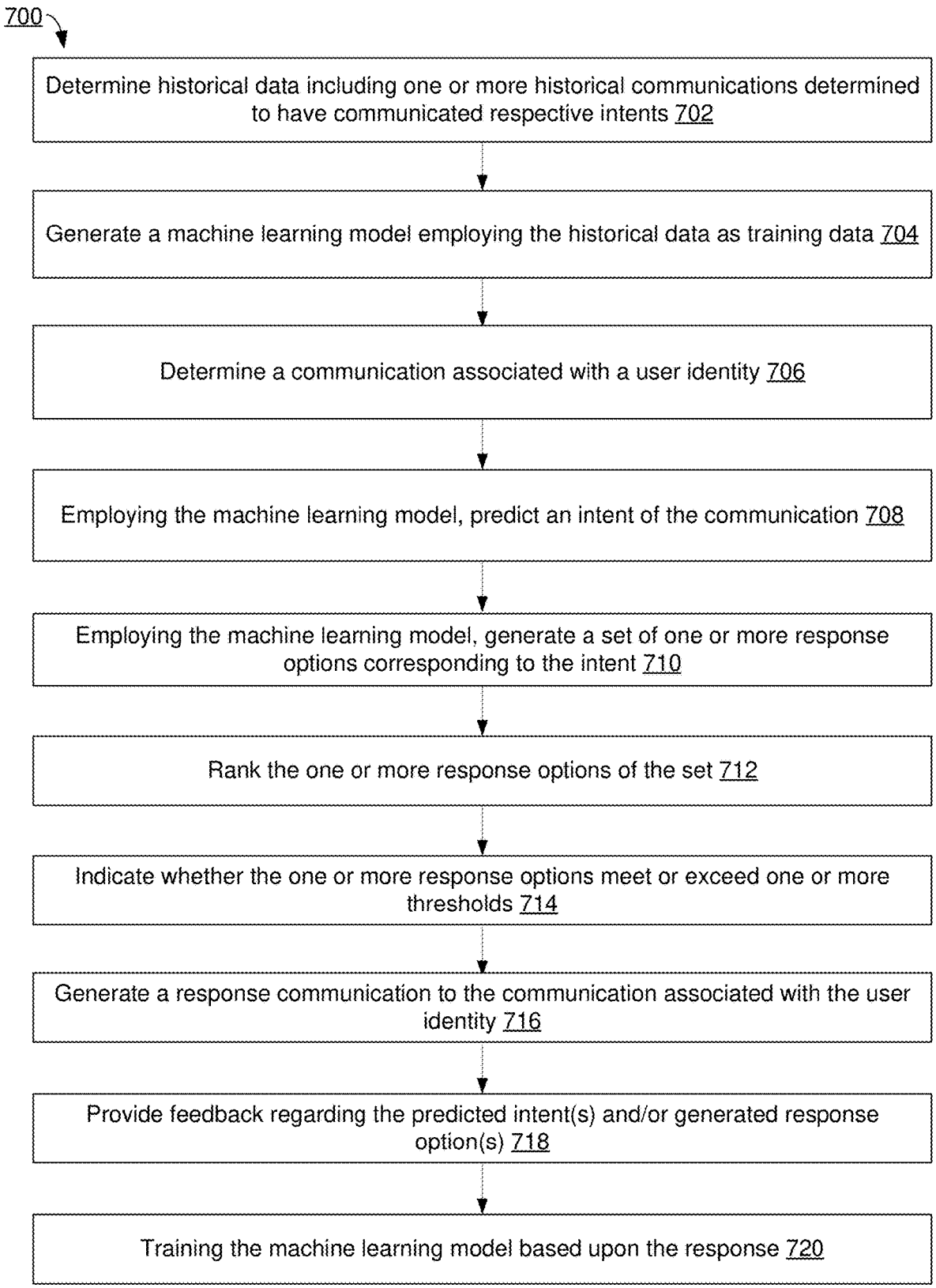
FIG. 7 illustrates an example process flow that can facilitate a process to employ machine learning and selectable response options to respond to a communication from an identity, in accordance with one or more embodiments described herein.

Turning now to FIG. 7, this figure illustrates a flow diagram of an example, non-limiting computer-implemented method 700 that can facilitate a process to employ machine learning and selectable response options to respond to a communication from an identity, in accordance with one or more embodiments described herein with respect to the non-limiting system architecture 200. It will be appreciated that while the computer-implemented method 700 is described relative to the non-limiting system architecture 200, the computer-implemented method 700 can be applicable also to the non-limiting system architecture 100. Repetitive description of like elements and/or processes employed in respective embodiments is omitted for sake of brevity.

Process flow 700 begins with operation 702. Operation 702 depicts determining, by the system (e.g., determination component 208 and/or model generation component 210), historical data including one or more historical communications determined to have communicated respective intents. This historical data can be disposed at a knowledge database (e.g., knowledge database 232) and/or elsewhere.

Operation 704 depicts generating, by the system (e.g., model generation component 210) a machine learning model (e.g., ML model 212) employing the historical data as training data.

Operation 706 depicts determining, by the system (e.g., determination component 208) a communication (e.g., communication 203) associated with a user identity (e.g., identity).

Operation 708 depicts predicting, by the system (e.g., prediction component 214) an intent of the communication (e.g., communication 203), such as employing, by the system (e.g., prediction component 214) the machine learning model (e.g., ML model 212).

Operation 710 depicts generating, by the system (e.g., response generation component 218), a set of one or more response options corresponding to the predicted intent, such as employing, by the system (e.g., response generation component 218) the machine learning model (e.g., ML model 212).

Operation 712 depicts ranking, by the system (e.g., classification component 216), the one or more response options of the set. In addition, the system (e.g., classification component 216) can be employed to rank the one or more predicted intents. It will be appreciated that the classification component 216 can employ the ML model 212 to facilitate the various rankings/classifications.

Operation 714 depicts indicating, by the system (e.g., classification component 216) whether the one or more response options satisfy, such as meet or exceed, one or more thresholds. It will be appreciated that visualization and/or other effect relative to the indications can be facilitated in part by the response generation component 218, such as relative to a user interface (e.g., user interface 240).

Operation 716 depicts generating, by the system (e.g., response generation component 218), a response communication (e.g., response 201) to the communication (e.g., communication 203) associated with the user identity. This operation 716 can include any of the one or more aspects discussed above relative to FIG. 5.

Operation 718 depicts providing feedback, by the system (e.g., feedback component 220), regarding the predicted intent(s) and/or generated response option(s).

Operation 720 depicts training, by the system (e.g., training component 222), the ML model (e.g., ML model 212) based upon the response (e.g., response 201), such as based upon the selected predicted intents, selected response options and/or other information of the response 201.

Figure 8:
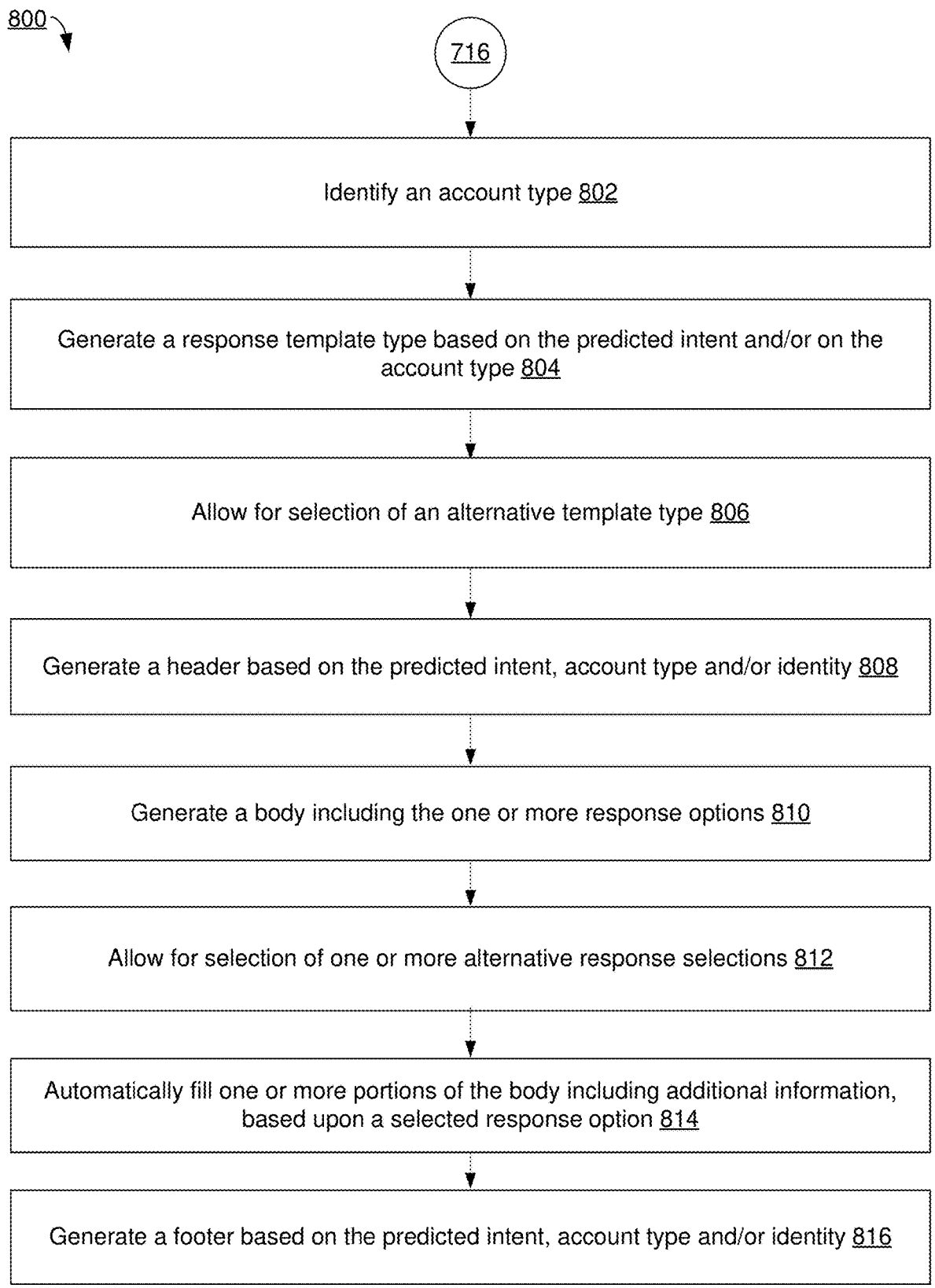
FIG. 8 illustrates a continuation of the example process flow of FIG. 7 that can facilitate a process to employ machine learning and selectable response options to respond to a communication from an identity, in accordance with one or more embodiments described herein.

Turning now to FIG. 8, this figure illustrates a flow diagram of an example, non-limiting computer-implemented method 800 that can facilitate a process to employ machine learning and selectable response options to respond to a communication from an identity, in accordance with one or more embodiments described herein with respect to the non-limiting system architecture 200. It will be appreciated that while the computer-implemented method 800 is described relative to the non-limiting system architecture 200, the computer-implemented method 800 can be applicable also to the non-limiting system architecture 100. Repetitive description of like elements and/or processes employed in respective embodiments is omitted for sake of brevity.

Operations 802 to 816 can stem from and/or be comprised by the response generation operation 716 of the computer-implemented method 700.

Operation 802 depicts identifying, by the system (e.g., response generation component 218), an account type.

Operation 804 depicts generating, by the system (e.g., response generation component 218), a response template type based on the predicted intent and/or on the account type.

Operation 806 depicts allowing, by the system (e.g., response generation component 218), for an alternative template type, such as be selection by a responding entity.

Operation 808 depicts generating, by the system (e.g., response generation component 218), a header based on the predicted intent, account type and/or identity.

Operation 810 depicts generating, by the system (e.g., response generation component 218), a body including the one or more response options.

Operation 812 depicts allowing, by the system (e.g., response generation component 218), for selection of one or more alternative response option selections, such as be selection by a responding entity.

Operation 814 depicts automatically filling, by the system (e.g., response generation component 218), one or more portions of the body including additional information, such as based upon a selected response option.

Operation 816 depicts generating, by the system (e.g., response generation component 218), a footer based on the predicted intent, account type and/or identity.

For simplicity of explanation, the computer-implemented methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. It can be appreciated that the operating procedures of process flow 700 are example operating procedures, and that there can be embodiments that implement more or fewer operating procedures than are depicted.

Furthermore, not all illustrated acts can be utilized to implement the computer-implemented methodologies in accordance with the described subject matter. In addition, those skilled in the art will understand and appreciate that the computer-implemented methodologies could alternatively be represented as a series of interrelated states via a state diagram or events. Additionally, it should be further appreciated that the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

Comprehensive Summary

In summary, the one or more embodiments described herein can enable a process to employ machine learning and selectable response options to respond to a communication from an identity. As compared to one or more existing techniques, the one or more embodiments described herein can facilitate response generation with increased accuracy in prediction of intents, quicker generation and/or more efficient generation. Increased efficiency can enable the response facilitation system 202 and/or responding entities to facilitate generation of more complex responses. Indeed, employment of the ML model 212 can reduce and/or remove a requirement of perfection relative to one or more tasks performed by a responding entity.

Over time, the ML model 212 can be further training, allowing for newly learned intents and/or response options, and thus growth of one or more knowledge databases. More responses can be completed in a given time. That is, in one or more cases, such training can allow for the response facilitation system 202 to increase its own efficiency, accuracy and speed over time. In one or more cases, proofing and/or quality review can be tiered down. In one or more cases one or more types of responses, such as based on one or more types of intents, can be more fully and/or fully automated, such as by the response facilitation system 202, absent involvement of a responding entity.

Indeed, in view of the one or more embodiments, a practical application of the response facilitation systems described herein can be proactive answering/responding to communication from user identities. Such responses can include additional personalization where the response facilitation systems employ mechanical operations previously facilitated by the responding entities, such as analysis of the incoming communications.

In one example, as one real-world result, both current and future concerns and/or deficiencies with responding to large volumes of user identity communications can be addressed. Via training of the ML models described herein, one or more responding entities can indirectly learn from one another, such as in view of selections made and/or feedback provided. This inherently can allow for less iterative feedback being provided relative to future response generations, and thus respectively shorter response reviews.

Moreover, it will be appreciated that a response facilitation systems described herein can be implemented in one or more domains to enable scaled response generations. Indeed, use of a response facilitation system as described herein can be scalable, such as where a response facilitation system can perform at least one response generation and/or communication analysis at least partially in parallel at a same time with another response generation and/or communication analysis, such as relative to plural incoming communications from one or more user identities.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

It is to be appreciated that one or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the field of non-monolithic architectures, such as cloud native and/or microservice architectures and cannot be equally practicably implemented in a sensible way outside of a computing environment.

It also is to be appreciated that one or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze a communication and/or generate a response in the time that one or more embodiments described herein can facilitate this process. And, neither can the human mind nor a human with pen and paper electronically analyze a communication employing an ML model and/or generated a response employing an ML model as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
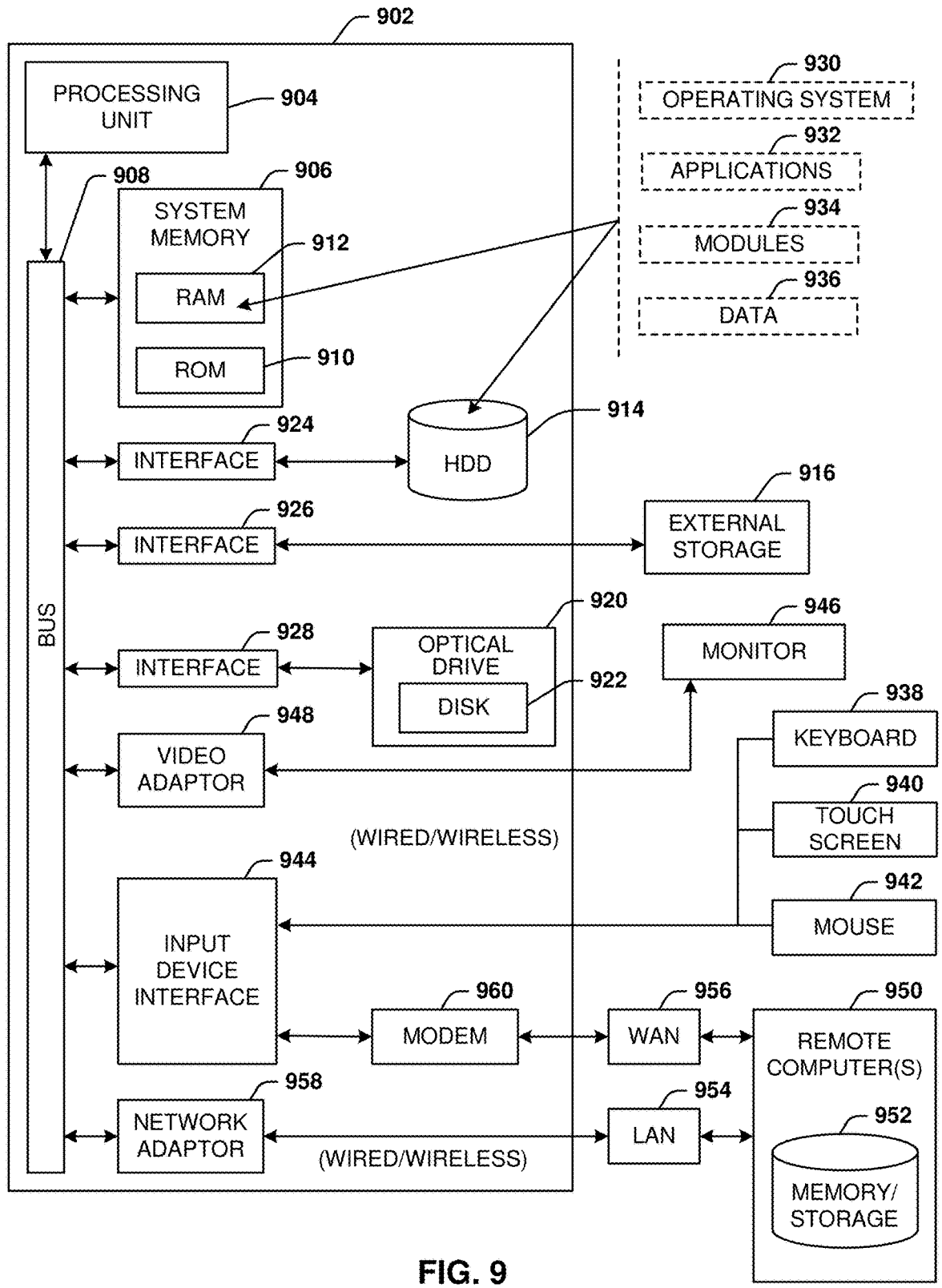
FIG. 9 illustrates an example block diagram of a computer operable to execute one or more embodiments described herein.

To provide additional context for various embodiments described herein, FIG. 9 and the following discussion are intended to provide a brief, general description of a suitable computing environment 900 in which the various embodiments of the embodiment described herein can be implemented.

For example, parts of computing environment 900 can be used to implement one or more embodiments of response facilitation system 102 of FIG. 1 and/or response facilitation system 202 of FIG. 2. In some examples, computing environment 900 can implement one or more embodiments of the process flows of FIGS. 7 and 8 to facilitate a process to employ machine learning and selectable response options to respond to a communication from an identity.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a nonvolatile storage such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

Processing unit 904 can comprise one or more types of processors and/or electronic circuitry (e.g., a classical processor, a quantum processor and/or like processor) that can implement one or more computer and/or machine readable, writable and/or executable components and/or instructions that can be stored at system memory 906. For example, processing unit 904 can perform one or more operations that can be specified by computer and/or machine readable, writable and/or executable components and/or instructions including, but not limited to, logic, control, input/output (I/O), arithmetic and/or the like. In one or more embodiments, processing unit 904 can be any of one or more commercially available processors. In one or more embodiments, processing unit 904 can comprise one or more central processing unit, multi-core processor, microprocessor, dual microprocessors, microcontroller, System on a Chip (SOC), array processor, vector processor, quantum processor and/or another type of processor. The examples of processing unit 904 can be employed to implement one or more embodiments described herein.

It will be appreciated that one or more aspects of the system memory 906 or processing unit 904 can be applied to memories such as 106 and/or 206 and/or to processors such as 104 and/or 204, respectively of the non-limiting system architectures 100 and/or 200. It also will be appreciated that the system memory 906 can be implemented in combination with and/or alternatively to memories such as 106 and/or 206. Likewise, it also will be appreciated that the processing unit 904 can be implemented in combination with and/or alternatively to processors such as 104 and/or 204.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enable with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above.

Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores computer executable instructions that, when executed by the processor, facilitate performance of operations, comprising:
   determining a communication associated with a user identity; and
   employing a machine learning model generated based on machine learning applied to one or more historical communications determined to have communicated respective intents,
       predicting an intent of the communication, resulting in a predicted intent; and
       generating a set of one or more ranked response options corresponding to the predicted intent, the one or more ranked response options being selectable via a user interface associated with an identity of an entity responsible for facilitation of a response to the communication, wherein the one or more ranked response options of the set are ranked based on respective confidence levels individually determined for the one or more ranked response options relative to the predicted intent of the communication.

2. The system of claim 1, wherein the machine learning model has further been generated based on one or more historical responses communicated in response to the one or more historical communications.

3. The system of claim 1, wherein the predicting the intent comprises determining, based on at least one meaning obtained based on an analysis of the communication, at least one outcome intended by communicating the communication associated with the identity.

4. The system of claim 1, wherein the set of one or more ranked response options comprises at least one subset of one or more response sub-options corresponding to a sub-intent or another intent, other than the predicted intent, of the communication predicted employing the machine learning model.

5. The system of claim 1, wherein the generating the set of one or more ranked response options comprises:
   determining whether the respective confidence levels individually determined for the one or more ranked response options satisfy at least one selectively determined threshold.

6. The system of claim 1, wherein the generating the set of one or more ranked response options comprises:
   generating a set of one or more response templates for the response to the communication, the set of one or more response templates comprising the set of one or more ranked response options and greeting language.

7. The system of claim 1, wherein the operations further comprise:
   receiving first input via the user interface, wherein the first input identifies a response option from the set of one or more ranked response options;
   generating a response message comprising the response option, the response message to be directed to a device associated with the identity in connection with the facilitation of the response to the communication; and
   receiving second input via the user interface, wherein the second input specifies additional response information to be added to the response message prior to the response message being directed to the device associated with the identity.

8. A method, comprising:
   predicting, by a system comprising a processor, an intent of a communication generated in association with an identity, resulting in a predicted intent; and
   generating, by the system, a group of response options for subsequent selection via user input from an entity facilitating a response to the communication, wherein the group of response options are ranked based on a confidence level assigned to the predicted intent, and wherein the confidence level is assigned based on one or more historical intents of one or more historical communications determined to be related to the communication.

9. The method of claim 8, wherein the predicted intent comprises an outcome intended by communicating the communication.

10. The method of claim 8, wherein a response option of the group of response options comprises a response to plural intents, of the predicted intent, intended by communicating the communication.

11. The method of claim 9, wherein a response option of the group of response options comprises a response to plural outcomes, of the outcome, intended by communicating the communication.

12. The method of claim 8, further comprising:
   generating, by the system, an indications for the predicted intent, wherein the indication denotes whether the confidence level assigned to the predicted intent satisfies a defined threshold.

13. The method of claim 8, further comprising:
   generating, by the system, a response template for response to the communication, the response template comprising a response option of the group of response options.

14. The method of claim 8, further comprising:
   generating, by the system, response information in response to a response option of the group of response options being selected via the user input.

15. A non-transitory computer-readable medium comprising instructions that, in response to execution, cause a system comprising a processor to perform operations, comprising:

predicting one or more intents of a communication, wherein the one or more intents are ranked based on confidence level of correspondence of the one or more intents to the communication by employing a machine learning model, and wherein ranking of the one or more intents results in one or more ranked intents;

generating one or more response options for facilitation of a response to the communication, wherein the one or more response options are provided differently for respective ones of the one or more ranked intents, and wherein the one or more response options are ranked based on confidence level of correspondence of individual ones of the one or more response options as responding to the respective ones of the one or more ranked intents by employing a machine learning model; and facilitating provision of the one or more response options in a selectable format to a device associated with an entity facilitating a response to the communication.

16. The non-transitory computer-readable medium of claim 15, the operations further comprising:

training the machine learning model based upon one or more historical intents corresponding to one or more historical communications determined to be related to the communication according to a similarity criterion.

17. The non-transitory computer-readable medium of claim 15, wherein the one or more response options are clustered into one or more sets based on the respective ones of the one or more ranked intents for which the one or more response options were generated.

18. The non-transitory computer-readable medium of claim 15, the operations further comprising:

assigning to the ranked one or more response options an indication of whether a confidence level assigned thereto satisfies one or more selectively determined confidence level thresholds.

19. The non-transitory computer-readable medium of claim 15, the operations further comprising:

receiving, from the device associated with the entity facilitating a response to the communication, an updated one or more confidence levels of the one or more intents.

20. The non-transitory computer-readable medium of claim 15, the operations further comprising:

generating a set of one or more response templates for use in responding to the communication, wherein the one or more response templates comprise additional response information in addition to the one or more ranked response options.

* * * * *